(12) United States Patent
Liang et al.

(10) Patent No.: US 7,340,236 B2
(45) Date of Patent: Mar. 4, 2008

(54) SYSTEM FOR OPERATIONAL COEXISTENCE OF WIRELESS COMMUNICATION TECHNOLOGIES

(75) Inventors: Jie Liang, Plano, TX (US); Matthew B. Shoemake, Allen, TX (US); Kofi Anim-Appiah, Allen, TX (US); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 834 days.

(21) Appl. No.: 10/635,067

(22) Filed: Aug. 5, 2003

(65) Prior Publication Data

US 2004/0029619 A1    Feb. 12, 2004

Related U.S. Application Data

(60) Provisional application No. 60/401,815, filed on Aug. 7, 2002.

(51) Int. Cl.
*H04B 1/06*      (2006.01)

(52) U.S. Cl. ................ 455/277.2; 455/277.1; 455/435.3; 455/41.2; 455/41.1; 455/63.1; 455/67.13

(58) Field of Classification Search .......... 455/41.2, 455/41.1, 63.1, 63.3, 67.13, 114.2, 277.2, 455/277.1, 435.3, 435.2, 101; 370/338, 341
See application file for complete search history.

(56) References Cited

U.S. PATENT DOCUMENTS

| | | | | |
|---|---|---|---|---|
| 5,530,926 | A | * | 6/1996 | Rozanski .................. 455/277.2 |
| 6,067,449 | A | * | 5/2000 | Jager ......................... 455/277.2 |
| 6,351,236 | B1 | * | 2/2002 | Hasler ....................... 342/357.9 |
| 7,046,649 | B2 | * | 5/2006 | Awater et al. ............... 370/338 |
| 7,089,033 | B2 | * | 8/2006 | Leinonen et al. ......... 455/553.1 |
| 2001/0016478 | A1 | * | 8/2001 | Lindenmeier et al. ... 455/277.1 |
| 2002/0002037 | A1 | * | 1/2002 | Ito et al. ...................... 455/101 |
| 2002/0061031 | A1 | | 5/2002 | Seed et al. |
| 2002/0107033 | A1 | * | 8/2002 | Kim ............................ 455/456 |
| 2002/0183032 | A1 | * | 12/2002 | Fang ........................... 455/280 |
| 2004/0018815 | A1 | * | 1/2004 | Lin et al. ....................... 455/73 |

FOREIGN PATENT DOCUMENTS

| | | |
|---|---|---|
| EP | 0 996 241 A | 4/2002 |
| WO | WO 02/063783 A | 8/2002 |

* cited by examiner

*Primary Examiner*—Rafael Perez-Gutierrez
*Assistant Examiner*—Khai Nguyen
(74) *Attorney, Agent, or Firm*—Steven A. Shaw; W. James Brady; Frederick J. Telecky, Jr.

(57) ABSTRACT

The present invention provides a system for providing simultaneous operation of disparate wireless telecommunication technologies within a single device (102). The device comprises a plurality of antennas (112, 114). The system provides an antenna switching function (116) communicatively coupled to the plurality of antennas. A first wireless telecommunications function (104) is communicatively coupled to the antenna switching function, as is a second wireless telecommunications function (106). The system provides an arbitration function (118) communicatively coupled to the antenna switching function and the first and second wireless telecommunications functions. A defined prioritization scheme is provided. The arbitration function operates to control access to the plurality of antennas by the first and second wireless telecommunications functions according to the defined prioritization scheme.

31 Claims, 2 Drawing Sheets

SYSTEM FOR OPERATIONAL COEXISTENCE OF WIRELESS COMMUNICATION TECHNOLOGIES

PRIORITY CLAIM

This application claims priority of U.S. Provisional Application No. 60/401,815, filed Aug. 7, 2002.

TECHNICAL FIELD OF THE INVENTION

The present invention relates generally to the field of wireless communications and, more particularly, to apparatus and methods for operational coexistence of wireless communication technologies operating within the same frequency range.

BACKGROUND OF THE INVENTION

Increasing demand for more powerful and convenient data and information communication has spawned a number of advancements in communications technologies, particularly in wireless communication technologies. A number of technologies have been developed to provide the convenience of wireless communication in a variety of applications.

In many common applications (e.g., laptop computers, mobile phones), it is often desirable or necessary to incorporate two or more different wireless communication technologies in a single device. Especially in consumer products, demand exists for the devices having multiple wireless technologies. Consider, for example, a laptop computer. It may be desirable to incorporate a short-range wireless technology for user interface functions (e.g., wireless voice headset), while at the same time incorporating a different wireless technology for high-speed system data communications (e.g., a wireless LAN). Other examples include mobile phones with Internet access, personal digital assistants (PDAs), and other similar compact data and information communication devices.

Unfortunately, current wireless communication technologies often conflict with each other, presenting system designers with a number of challenges and problems. Most common wireless technologies operate within one of only a few unlicensed high-frequency transmission bands. Thus, many different technologies are designed to operate within a given high-frequency band (e.g., 2.4 GHz). Use of the same high-frequency band is usually not a problem where two applications, utilizing two different wireless communication technologies, are separated by some significant distance. However, in applications where two different wireless communication technologies, attempting to use the same transmission band, are very close together or collocated within a single device (e.g., mobile phone, laptop computer), a number of problems arise. As the different technologies attempt to compete for simultaneous access to the transmission band, contention and loss of data packets can result in significant reductions in the quality and integrity of data transmission.

In the past, several attempts have been made to address this contention problem. Most such attempts have involved either: 1) incorporating only a single wireless communication technology within a given device (i.e., limitation); or 2) requiring an end-user to select only one of multiple available wireless communication technologies to be active at any given time (i.e., end-user arbitration). In the first approach, a particular device was limited to incorporating a single wireless technology. For example, an end-user ordering a laptop computer was given the choice between including either wireless LAN technology or Bluetooth technology, but not both, in their computer. In the second approach, an end-user was provided with multiple wireless technologies, but was required to manually arbitrate between the two because simultaneous operation was not possible. For example, a PDA user would have to manually switch from wireless Internet operation to hot-synch operation, and back again, because the technologies for each function could not operate on the same transmission band simultaneously.

Some prior methods have attempted to address the issue of simultaneous operation by physically separating the antennas through which each technology accesses the transmission band. Because many wireless technologies are relatively short-range, contention problems between technologies can be reduced or eliminated with enough physical separation between antennas. Unfortunately, the number of antennas required by certain technologies (e.g., wireless LAN), and the extremely small size certain end-user equipment (e.g., mobile phones) drastically reduce, if not eliminate completely, the usefulness of such an approach.

As a result, there is a need for a system that provides simultaneous operational coexistence of collocated wireless communication technologies within a single transmission frequency band, providing robust high-performance communication in an easy, efficient and cost-effective manner.

SUMMARY OF THE INVENTION

The present invention provides simultaneous operational coexistence of collocated wireless communication technologies within a single transmission frequency band. Specifically, the present invention provides a system that arbitrates competing communications from different technologies on a packet-by-packet basis in a manner that is transparent to the end user—optimizing communication efficiency and effectively providing simultaneous operation. A prioritization scheme is provided, presenting the ability to balance or bias communication as desired. The system of the present invention further provides an antenna switching system that optimizes efficient utilization of standard antenna systems provided in most end-user applications. The system of the present invention thus provides robust, high-performance communication in an easy, efficient and cost-effective manner while overcoming certain limitations associated with previous methods and systems.

More specifically, the present invention provides a device having first and second antennas, and an antenna switching function communicatively coupled to the antennas. A first wireless telecommunications function is communicatively coupled to the antenna switching function, as is a second wireless telecommunications function. The device further comprises arbitration function, communicatively coupled to the antenna switching function and the first and second wireless telecommunications functions. The arbitration function is adapted to control access to the first and second antennas by the first and second wireless telecommunications functions according to a defined prioritization scheme.

The present invention further provides a method of providing, within a single device, simultaneous operation of disparate and potentially conflicting wireless telecommunication technologies. The method provides a device having a plurality of antennas, and an antenna switching function communicatively coupled to the plurality of antennas. First and second wireless telecommunications functions, communicatively coupled to the antenna switching function, are provided. An arbitration function is communicatively coupled to the antenna switching function and the first and second wireless telecommunications functions. A defined prioritization scheme is provided, and the arbitration function is utilized to control access to the antennas by the first and second wireless telecommunications functions according to the prioritization scheme.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The present invention may be utilized in numerous applications where the simultaneous operation of different wireless communication technologies within a single transmission band is desirable. For purposes of explanation and illustration, however, the present invention will now be described in conjunction with the coexistence and simultaneous operation of wireless LAN (i.e., IEEE 802.11g) and Bluetooth technologies within a single device. The specific embodiments discussed herein are merely illustrative of specific ways to make and use the invention and do not limit the scope of the invention.

The present invention provides simultaneous operational coexistence of disparate wireless communication technologies within a single transmission frequency band. One particularly illustrative embodiment combines the use of an efficient short-range, point-to-point wireless technology (e.g., Bluetooth), with a high-speed, long-distance technology (e.g., IEEE 802.11g wireless LAN). Both such technologies operate in the same unlicensed transmission frequency band (i.e., 2.4 GHz). As such, the simultaneous operation of both technologies presents the potential for problems associated with conventional apparatus and methods. Unlike conventional approaches, however, the present invention arbitrates the two competing technologies, providing an efficient and simultaneous sharing of communication bandwidth and resources. The present invention achieves this result utilizing several functional systems.

Wireless LAN (WLAN) systems typically employ a two antenna system, providing a subdivision of a given transmission band into several channels. Most conventional systems dedicate two antennas to WLAN on a full-time basis. If that conventional system is to also include Bluetooth functionality, then either: 1) a separate antenna for Bluetooth must be provided; or 2) Bluetooth must share one of the WLAN antennas, causing the system to operate exclusive in Bluetooth or WLAN mode. In many consumer applications (e.g., wireless phones, PDAs, laptops), the inclusion of an extra antenna is either not physically possible or is cost prohibitive. Moreover, the ability to operate only one wireless technology at a time limits the utility of including multiple technologies in a single device.

Figure 1:
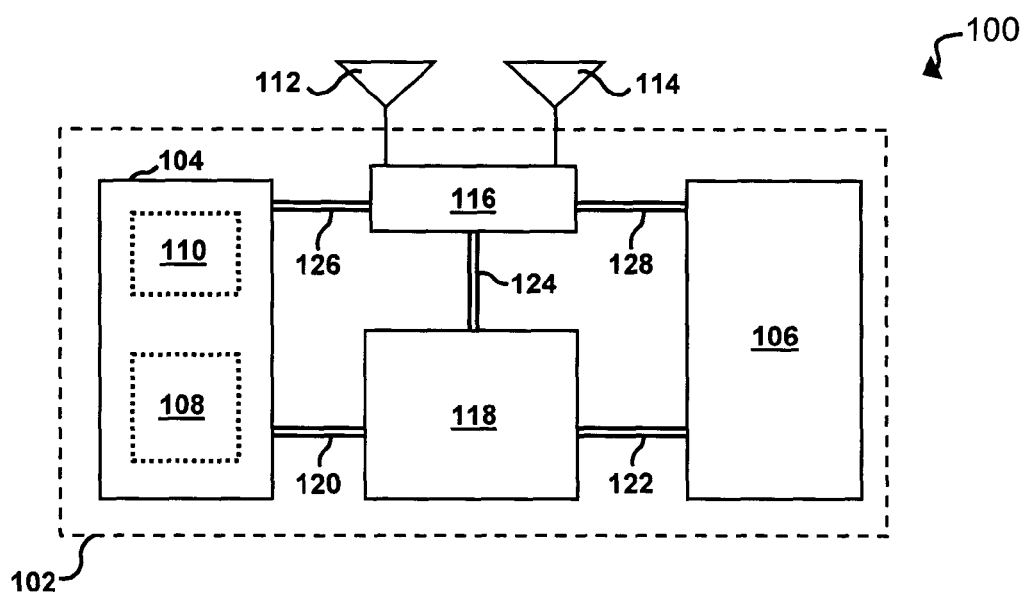
FIG. 1 is an illustration of one embodiment of a wireless communications system according to the present invention.

Unlike other approaches, the system of the present invention provides a system by which disparate wireless technologies share antenna access, and thus access to the transmission frequency band, on a real-time basis. The system of the present invention provides arbitration such that, for the wireless technologies utilized, communication or data loss is minimized, and such that the arbitration process is transparent to the end-user. Arbitration is provided on a packet-by-packet basis, according to a predetermined scheme of assumptions and priorities based on the end-use application. This scheme can be altered or modified as desired or necessary. The present invention is now described in reference to system 100 of FIG. 1.

System 100 comprises an end-user device 102, such as a mobile phone, PDA, palmtop or laptop computer, incorporating both WLAN and Bluetooth technologies for simultaneous operation. As such, device 102 comprises a WLAN function 104 and a Bluetooth function 106. In the embodiment depicted in FIG. 1, WLAN function 104 operates according to the IEEE 802.11g standard. Function 104 comprises an operational logic portion 108 and an RF transceiving portion 110. Device 102 further comprises first and second antenna 112 and 114, respectively. Each is communicatively coupled to antenna switching function 116. Device 102 further comprises arbitration function 118. Function 118 is communicatively interfaced to functions 104, 106 and 116 by links 120, 122 and 124, respectively. Antenna switching function 116 is communicatively interfaced to functions 104 and 106 by links 126 and 128, respectively.

The functional elements of system 100 may be implemented in a variety of ways—relying on software, hardware, or combinations of both. Although depicted as separate functional instances, the constituent elements of system 100 may be integrated or combined as necessary or convenient for design purposes. For example, antenna switching function 116 and arbitration function 118 may be provided as a single semiconductor device, or may be provided as subportions of software operating with a processor. In other embodiments, arbitration function 118 may be incorporated with logic portion 108 in a single semiconductor device or software construct. In several embodiments, most functional elements may be provided via a compact chipset combining processor and software operations. Other varied combinations and alternatives, operating in accordance with the teachings of the present invention, are hereby comprehended.

Operation of system 100 is now described in reference to the following example scenario. Assume that, within device 102, Bluetooth function 106 has data that it needs to transmit. Arbitration function 118 receives a number of signals from functions 104 and 106, via links 120 and 122, respectively. Function 106 sends to function 118, via link 122, a transmission request or some other similar access reservation request. Upon receiving the transmission request from function 106, function 118 communicates with functions 104 and 116, via links 120 and 124, respectively, to evaluate current traffic to and from function 104. If there is no conflict (e.g., function 104 is neither transmitting or receiving), function 118 selects, via function 116, either antenna 112 or 114 and allows function 106 to begin transmission on the selected antenna. If a potential conflict exists, function 118 evaluates the nature of the data traffic and requests from both sides, and resolves priority for access to the antenna according to a defined prioritization scheme.

If both functions 104 and 106 are attempting to transmit at the same time, it may be desirable, in some embodiments, to assign an antenna to each and allow simultaneous transmission or reception. Although packet collisions typically occur, certain applications may allow for simultaneous transmission and rely on receiving devices to handle any error detection and correction. In a number of other embodiments, however, simultaneous transmission is not desirable. In still more embodiments, transmission by either function 104 or 106 is precluded during reception by the opposite function, depending upon the particular priority or hierarchy scheme provided. For example, in a number of embodiments, voice transmission and reception over Bluetooth is given priority over all other data traffic. No matter what class of data is being transmitted or received on WLAN function 104, function 118 denies function 104 antenna access during the Bluetooth receive segment. In most implementations, Bluetooth reserves an entire transmission and reception period even when only receiving. Thus, in some implementations, function 118 may allow function 104 to continue transmission (i.e., access to antenna) until the receive period for Bluetooth function 106 begins. In instances where Bluetooth function 106 is not seeking to send or receive voice data, function 118 then arbitrates the antenna access granted to either function 104 or 106 based on the priority scheme. The priority scheme may incorporate a fixed or dynamic bias factor that weights the access allotment process in a desired manner. For example, all non-voice priority may be given to function 104 such that function 106 can only access antenna when function 104 is inactive. Other weighting and balancing schemes are also comprehended, such as dynamic balancing based on activity in a given time period.

Links 120 and 122 each comprise a radio control signal. Function 118 uses the radio control signal to control the respective function's access to either of the antennas 112 and 114. If function 118 allows antenna access to function 104 or 106, or both, it will select either or both antennas via link 124 and send the appropriate radio control signal. Function 118, via the radio control signal and switching function 116, may deny either function 104 or 106 antenna access. Even though antenna access has been denied, either function 104 or 106 may be configured to continue to transmit, utilizing its own transmission error correction mechanism (e.g., retry, timeout) until given antenna access. This process continues on a packet-by-packet basis.

Unlike certain conventional systems, neither function 104 or 106 has its own dedicated antenna. Instead, functions 104 and 106 are tied, via links 126 and 128, respectively, to switching function 116. When antenna access is granted by function 118 to either function 104 or 106, switching function 116 makes communicative connection between the selected antenna and the accessing function. Function 118 provides, via link 124, an antenna select signal that indicates to function 116 which antenna should be accessed. Both antennas may be accessed by functions 104 and 106 singly, alternatively, or jointly. Thus, if WLAN function 104 is operating in a dual antenna mode, it may be granted access to both antennas 112 and 114. If both function 104 and 106 are allowed to simultaneously transmit, function 104 may be granted access to antenna 112 and function 106 may be granted access to antenna 114, or vice-versa. Alternatively, function 116 may be provided with an evaluation mechanism to determine which antenna is active. Upon receiving an antenna select communication from function 118, function 116 evaluates the activity on both antennas 112 and 114. If the selected antenna is inactive, then the requested selection is completed. If the selected antenna is active, function 116 sends a signal back to function 118 that the antenna is active. Either function 116 or function 118, independently or in combination, may then determine whether to: ignore the antenna selection signal; use the other antenna; or switch to the selected antenna anyway. The antenna switching function 116 may be linked to the prioritization scheme utilized by function 118, or it may have its own similar prioritization scheme. For example, if either antenna is transmitting or receiving Bluetooth voice traffic, any switching on either antenna may be disallowed so as to avoid user-perceivable, switching-induced static or pops in the voice signal.

The arbitration unit of the present invention thus provides as an operational buffer between the two wireless telecommunication functions and the antennas. The arbitration unit intercepts and receives antenna access and control signals from one or both of the wireless telecommunication functions and, according to a defined prioritization scheme, allocates access to the antennas. The prioritization scheme may include, among other things, a contention scheme that provides for weighting or bias in favor of one particular type of communication or of one of the wireless telecommunication functions. Among its capabilities, the arbitration unit is provided with control over each wireless telecommunication function's radio transmission. This control is designed such that, if operational or prioritization requirements so demand, the arbitration can force radio "silence" on either or both wireless telecommunication functions.

Figure 2:
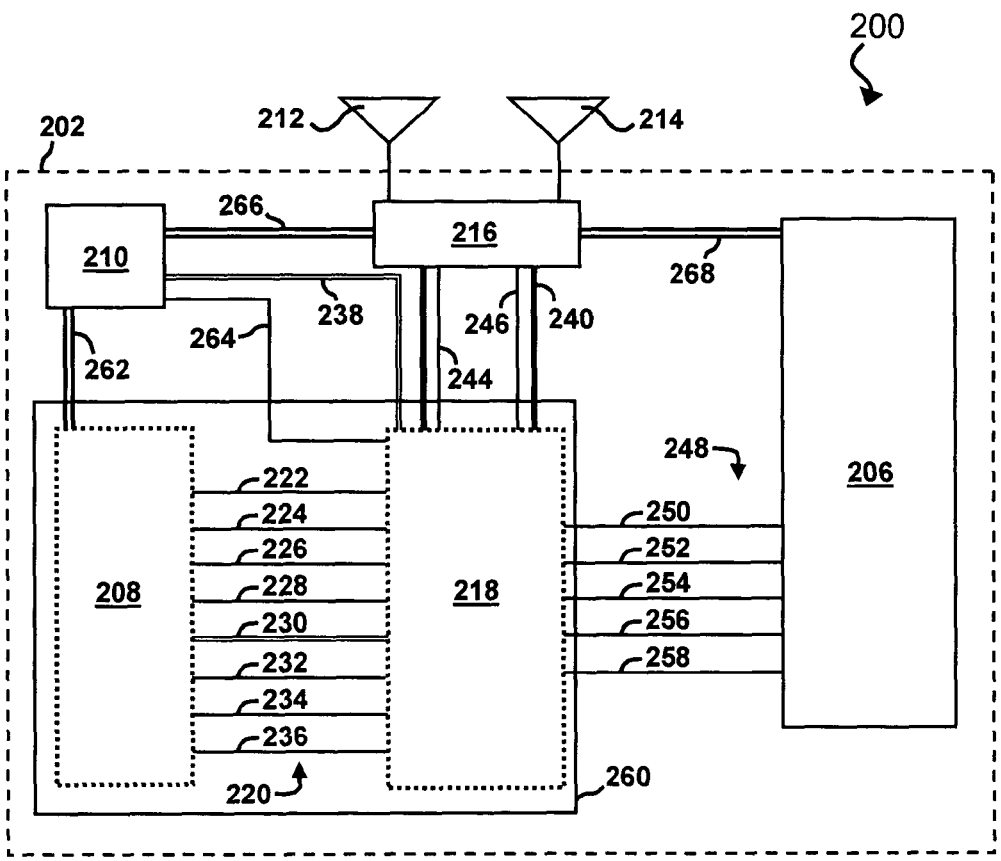
FIG. 2 is an illustration of another embodiment of a wireless communications system according to the present invention.

Certain specific embodiments of the functions and processes described above are now presented in greater detail for illustrative purposes, beginning with reference to FIG. 2. FIG. 2 depicts system 200, representing one embodiment of system 100. System 200 comprises an end-user device 202, such as a mobile phone, PDA, palmtop or laptop computer, incorporating both WLAN and Bluetooth technologies for simultaneous operation. As such, device 202 comprises a WLAN function and a Bluetooth function 206. In the embodiment depicted in FIG. 2, the WLAN function operates according to the IEEE 802.11g standard. As such, the WLAN function comprises an operational logic portion 208 and an RF transceiving portion 210. Device 202 further comprises first and second antenna 212 and 214, respectively. Each is communicatively coupled to antenna switching function 216. Device 202 further comprises an arbitration function 218, in this case referred to as a coordinator unit.

In system 200, unit 218 is communicatively interfaced to portion 208 by link 220 that, in this embodiment, comprises a signal bus. Bus 220 comprises signal lines 222, 224, 226, 228, 232, 234, 236 and bus 230. Unit 218 is further communicatively coupled to portion 210 by link 238. In this embodiment, link 238 is a bus comprising several signal lines. Unit 218 is communicatively interfaced to function 216 by link 240 that, in this embodiment, comprises signal lines 244 and 246. Unit 218 is communicatively interfaced to function 206 by link 248 that, in this embodiment, also comprises a signal bus. Bus 248 comprises signal lines 250, 252, 254, 256 and 258. In this embodiment, the logical or operational implementations of portion 208 and unit 218 are combined within a single construct or device 260 (e.g., processor, programmable logic device, program code). WLAN portion 210 is implemented external to device 260, but is communicatively interfaced with portion 208 via link 262. Device 260 also has communicative link 264 with portion 210. Link 264 couples portion 210 to unit 218. Antenna switching function 216 is communicatively interfaced to portion 210 by link 266, and to function 206 by link 268.

Within system 200, unit 218 controls both the WLAN radio and the Bluetooth radio directly, providing real-time control. Unit 218 provides antenna diversity capabilities for two-antenna WLAN configurations, while sharing antenna resources with the accompanying Bluetooth system. For this particular embodiment, operational and prioritization schemes of unit 218 comprehend several assumptions or requirements, such as: 1) simultaneous transmission and receiving should be avoided, since transmission of either the WLAN or Bluetooth function may saturate the RF front-end of the other function, resulting in loss of receive packets; 2) Bluetooth voice link takes precedence over other traffic types; 3) WLAN and Bluetooth data traffic should contend for bandwidth according to a defined priority/bias scheme; and 4) simultaneous transmissions are allowed, even for Bluetooth transmissions that are in the same frequency band as that of the WLAN function. Regarding this last consideration, simultaneous transmissions are most often desirable—from an overall throughput point of view—when Bluetooth operational hops are out of band. Where Bluetooth conducts in-band transmissions, it is possible that the intended receivers could correctly decode the packets addressed to them—due to channel diversity, introduced by the two antennas, and noise-suppression techniques that may be used at the receivers. For this embodiment, overlapping transmissions—regardless of their center frequencies—are allowed to simplify the structure and operation of unit 218. In alternative embodiments, however, unit 218 may be provided such that overlapping transmissions are not allowed. For example, Bluetooth hopping may be modified such that hops to a channel occupied by WLAN are avoided completely. Further-more, some minimum buffer between center frequencies may be defined and comprehended during operation.

Unit 218 has a number of inbound and outbound signal lines. Those lines are now defined in greater detail with reference to FIG. 2 and to the following tables:

TABLE 1

Signals Inbound to Unit 218

| FIG. 2 Ref. No.: | Signal Source: | Signal Name: | Purpose: |
|---|---|---|---|
| 224 | Portion 208 | RX_ACT | Indicates whether portion 208 is in active receive mode (1 - active, 0 - not active) |
| 226 | Portion 208 | 208_PR | Indicates priority level of portion 208 TX or RX packets: 1 - high priority (e.g., Ack frame), 0 - low priority (new data frame exchange) |
| 228 | Portion 208 | 208_ANT_SEL | Antenna select line for portion 208. Unit 218 takes this as input, and matches it with current status of function 206. When function 206 is not active, this signal is passed to |

TABLE 1-continued

Signals Inbound to Unit 218

| FIG. 2 Ref. No.: | Signal Source: | Signal Name: | Purpose: |
|---|---|---|---|
| | | | control antenna configuration. Otherwise, antenna configuration is unchanged. |
| 230 | Portion 208 | RCTL_A0 | Radio control signal: Radio Power On |
| | Portion 208 | RCTL_A1 | Radio control signal: Radio Receiver Enable |
| | Portion 208 | RCTL_A2 | Radio control signal: Radio Transmit Enable |
| 232 | Portion 208 | DATA_EN | Enable signal for the data signals |
| 234 | Portion 208 | DATA_LATCH | Rising edges latch the data signal |
| 236 | Portion 208 | DATA_LINE | Data signal from portion 208 to unit 218 |
| 252 | Function 206 | COR_WIN | Correlation window |
| 254 | Function 206 | RX-STRETCH | Receive active signal |
| 256 | Function 206 | TX-STRETCH | Transmit active signal |
| 258 | Function 206 | SCO_TX_EN | SCO transmit enable signal |

TABLE 2

Signals Outbound from Unit 218

| FIG. 2 Ref. No.: | Signal Destination: | Signal Name: | Purpose: |
|---|---|---|---|
| 222 | Portion 208 | TX_EN | Indicates whether portion 208 is permitted to transmit |
| 238 | Portion 210 | RCTL_0 | Radio control signal: Radio Power On |
| | Portion 210 | RCTL_1 | Radio control signal: Radio Receiver Enable |
| | Portion 210 | RCTL_2 | Radio control signal: Radio Transmit Enable |
| 244 | Function 216 | ANT_SEL | Antenna control switch |
| 246 | Function 216 | ANT_SEL_Neg | Negative of ANT_SEL |
| 250 | Function 206 | R_SLEEP | Idle signal to Function 206 radio |
| 264 | Portion 210 | R_ANTSEL | External antenna port access |

As previously described, unit 218 directly controls the transmission status of both the 802.11g radio system and the Bluetooth radio system to improve overall communication throughput. Control of the 802.11g radio system within system 200 is now described in greater detail. In many such WLAN systems, transmission or receiving status of an 802.11g RF radio module is controlled by three radio control signals: Power Down (PD), Receiver Enable (RE), and Transmitter Enable (TE). Status of the RF radio module is manipulated by combining these three control signals, in accordance with Table 3:

TABLE 3

RF Radio Module Control

| TE | PD | RE | Radio Status |
|---|---|---|---|
| 1 | 0 | X | SLEEP Mode |
| 1 | 1 | 1 | Receive Mode |
| 1 | 1 | 0 | Transmit Mode |

In system 200, these three control signals originate from portion 208. Unit 218 receives, as inputs, these signals output from portion 208. Unit 218 then controls the RF radio of portion 210 through signal bus 238 (i.e., signals RCTL_0, RCTL_1 and RCTL_2). Depending upon the current operational state of system 200, unit 218 either relays the original radio control signals from portion 208, or sets the radio control signals in accordance with the operational and prioritization schemes (e.g., transmits control signals that switch the RF radio of portion 210 from Transmit to Receive mode, until the end of a Bluetooth reception). The following pseudo-code segment represents one embodiment of the above-described operation of unit 218:

```
        If (206_RX_ACTIVE = 0) || (208_PR = 1)
        /* Function 206 is not receiving or portion 208 has high priority
(1)     packet to transmit*/
            {RCTL_0 = PD, RCTL_1 = RE; RCTL_2 = TE};
        else /* 206_RX_ACTIVE is set */
            RCTL_0 = 0; /*turns off the 802.11 radio*/
```

The 206_RX_ACTIVE signal is a signal internal to unit 218 that is generated considering a number of operational and priority factors. The following pseudo-code segment represents one embodiment of generation of 206_RX_ACTIVE:

```
        If ((Function 206 is in Master mode) & (in previous hop, Function
        206 was granted permission to transmit))
            {206_RX_ACTIVE = 1 for the duration of the correlation
            window;
(2)         After the correlation window,
            206_RX_ACTIVE = RX-STRETCH;}
        else
            206_RX_ACTIVE = RX-STRETCH;
```

Thus, in system 200, when function 206 is master of its piconet and it has permission to transmit, it is guaranteed to be able to receive for the next hop. Therefore, the 802.11 radio is prohibited from transmitting during the correlation window of the next Bluetooth receive slot. After the correlation window, if a valid packet is detected (i.e., RX-STRETCH goes high), then the 802.11 radio is continuously repressed. If no valid packet is detected during the correlation window, 206_RX_ACTIVE is reset, and control of the 802.11 radio returns to pass-through of the control signals originating from portion 208. Master/slave status may be stored in an internal register of unit 218, setup during initialization, and updated through the interface between portion 208 and unit 218 when the status changes. Once a transmit request from portion 208 is denied, the RF radio is not allowed to transmit at all during the current packet. This is done by monitoring the change in RX/TX status, as indicated by the state of the radio control lines (PD, TE, RE). A change from RX state to TX state indicates the start of a new TX request.

With heavy traffic loads on both the WLAN and the Bluetooth networks, the throughput bias toward either the WLAN or Bluetooth function may be adjusted using a statistical contention scheme. The permission grant for the Bluetooth function, especially when it is a master, is decided based on this contention scheme. Any desired statistical contention scheme may be employed—having static, dynamic, or pseudo-dynamic properties. For example, within a given time period, permission for Bluetooth transactions may be limited to a predetermined number. If attempted Bluetooth transactions within that time period exceed the predetermined number, then excessive attempts are denied until the next time period. In another example, incrementing and decrementing counters for WLAN, Bluetooth, or both may be provided and utilized to provide a relative weighting factor in resolving contention. Other examples of contention schemes are described hereinafter. Alternative algorithms and methods, providing contention resolution in accordance with the present invention, are also comprehended.

Figure 3:
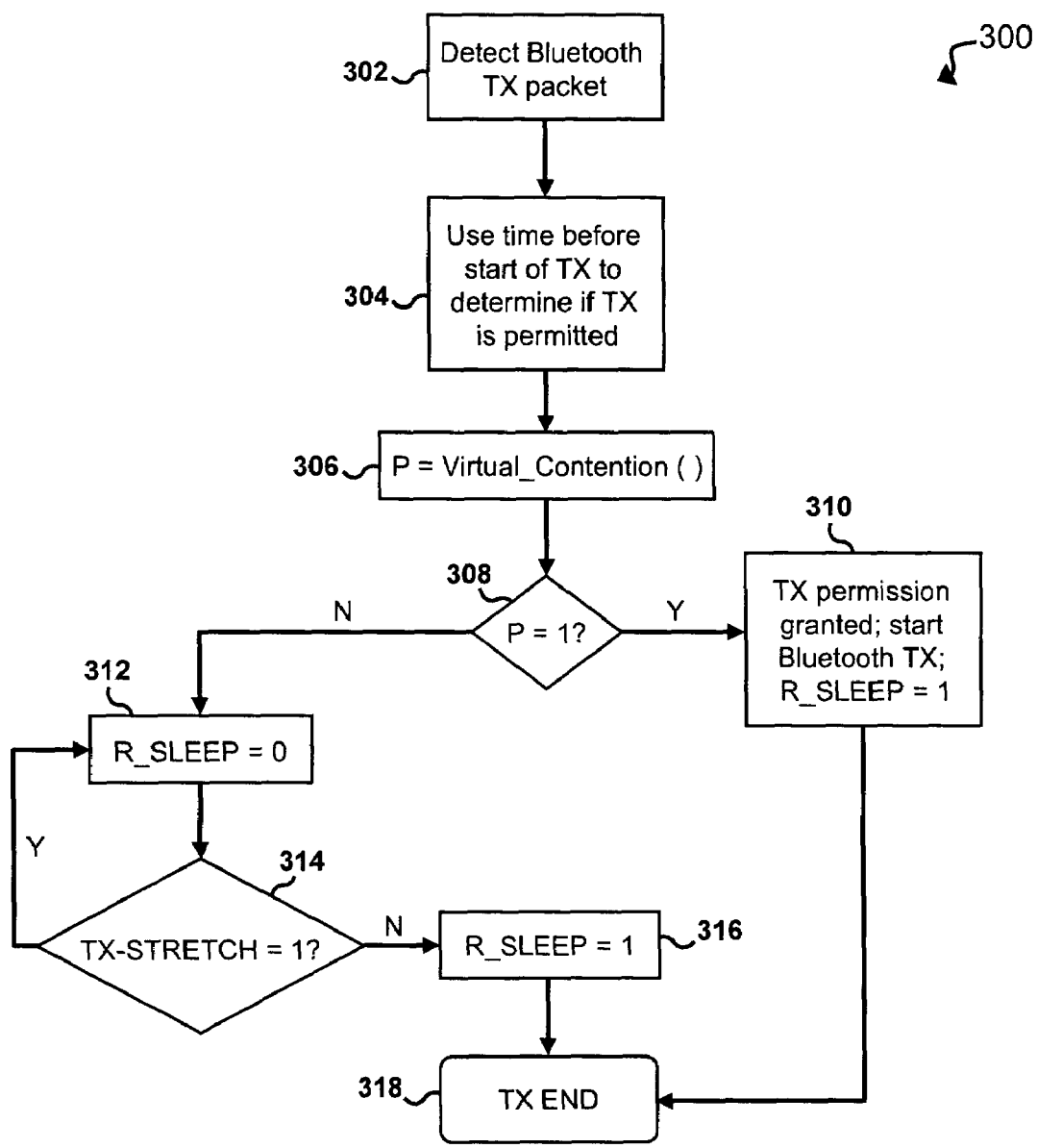
FIG. 3 is an illustration depicting a wireless technology control process in accordance with one embodiment of the present invention.

Control of the Bluetooth radio system within system 200 is now described in greater detail with reference to FIG. 3. Bluetooth radio functionality is controlled by unit 218, through line 250 (R_SLEEP). By setting R_SLEEP low (0), Bluetooth radio operation is set to standby mode. FIG. 3 illustrates Bluetooth radio control process 300, in accordance with one embodiment of the present invention. First, a Bluetooth transmission packet or request is detected 302. In the time remaining before transmission should start, unit 218 determines 304 if the Bluetooth transmission should be permitted. This determination utilizes a virtual contention function 306 that returns a numeric value indicating a contention outcome (P). Unit 218 evaluates 308 the returned value of (P). If P equals (1), transmission permission is granted 310 to Bluetooth function 206 and R_SLEEP is set high (1). If P does not equal (1), unit 218 next sets R_SLEEP to low (0) 312, and then evaluates 314 the value of TX-STRETCH. If TX-STRETCH equals (1), R_SLEEP is kept low (0) until TX-STRETCH goes low (0). Once TX-STRETCH is low (0), R_SLEEP is set high (1) 316, and function 206 transmits until its transmission ends 318.

As described above, each transmission opportunity for Bluetooth radio is determined by a contention function (P), which returns a numeric value indicating a contention outcome. The following pseudo-code segment represents one embodiment of (P):

```
        P = virtual_contention ( )
        {
            logic_signal P;
            int r;
            if(SCO_TX_EN = 1)
                P =1;
            elseif (RX_ACT = 1)
                {
                /* virtual contention used only when there is a
                reservation from portion 208 */
                if (208_PR = 1)
(3)                 P=0; /* portion 208 has high priority
                    reservation, defer to portion 208 */
                else
                    {
                    r = rand ( );  /* generate random number */
                    if (r> T_bias)
                        P=1;
                    else
                        P=0;
                    }
                }
            else
                P=1;
            return P;
        }
```

Unit 218 comprises a random number generation function, which may be implemented in either hardware or software. Depending upon the particular design requirements and limitations, the range of the random number generator may be varied greatly. Similarly, randomness of the generated sequences may be varied greatly. In a number of embodiments, a random number generator range of [0

255] provides an optimal balance of randomness and processing efficiency. The value ($T_{bias}$) is an 8-bit number that may be either: a fixed and pre-determined value (e.g., loaded from a register), or dynamic and scalable value that may be adjusted over time (e.g., updated by a processor algorithm). 208_PR is set by portion 208 (e.g., through firmware) and, in most applications, is used to reserve the channel for receiving or transmitting ACK frames.

In system 200, unit 218 supports WLAN antenna diversity mode without sacrificing Bluetooth system performance, even though only two antennas are provided. Unit 218 prohibits antenna switching by portion 208 while function 206 is actively receiving, transmitting, or correlation window searching for packets. Therefore, 208_ANT_SEL is modulated inside unit 218 by COR_WIN, RX-STRETCH AND TX-STRETCH. When at least one of these three signals is active, 208_ANT_SEL is disabled and the antenna switch outputs (ANT_SEL, ANT_SEL_Neg) from unit 218 held at their current state.

Unit 218 utilizes a number of values and parameters during its operation. Operational and prioritization parameters (e.g., traffic bias threshold, master/slave mode of the Bluetooth function, antenna configuration) may be stored in memory locations (e.g., registers) within unit 218, loaded into unit 218 from an external source (e.g., a processor), or combinations of both. In system 200, such information is loaded into unit 218 from portion 208 by state-machine operation. DATA_EN is set high, activating the state machine operation within unit 218. During this operation, parameters and information are latched into registers within unit 218 from DATA_LINE, upon rising edges of DATA_LATCH.

During operation of system 200, a number of signals impact the system's functions. The RX_ACT signal indicates to unit 218 that portion 208 is either in active receive mode (i.e., a valid packet header has been identified) or that portion 208 is trying to reserve a given channel. Within system 200, this signal forces function 206 to contend for transmission access. Combining RX_ACT with 208_PR, portion 208 is capable of blocking function 206 from obtaining transmission access. In system 200, portion 208 asserts RX_ACT signal when: 1) portion 208 receives a Header interrupt signal; 2) after portion 208 completes a transmission and needs to search for an ACK packet; and 3) upon determination that function 206 should be forced into contention-based channel access. Within the prioritization scheme of system 200, 208_PR is provides portion 208 the ability to assert priority over function 206 for channel access. When 208_PR is set high (1), function 206 is forced to defer to portion 208 for channel access, without intervention of a contention function. TX_EN controls transmission of the WLAN function. In the particular configuration illustrated by system 200, unit 218 directly controls the RF radio. Thus, the TX_EN signal serves as a status feedback mechanism for internal operations of portion 208. This signal also provides portion 208 with a means to determine if a particular packet loss is due to collision with the collocated Bluetooth function, or with other 802.11g devices.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A device comprising:
   a first antenna;
   a second antenna;
   an antenna switching function using a probabilistic approach communicatively coupled to the first and second antennas capable of operating in a dual-antenna mode for providing diversity capabilities;
   a first wireless telecommunications function communicatively coupled to the antenna switching function;
   a second wireless telecommunications function communicatively coupled to the antenna switching function; and
   an arbitration function, communicatively coupled to the antenna switching function and the first and second wireless telecommunications functions, and adapted to directly control the first and second wireless telecommunications functions and access to the first and second antennas by the first and second wireless telecommunications functions according to a defined prioritization scheme of a plurality of assumptions and priorities based on an end-use application, wherein the arbitration function is provided on a packet-by-packet basis.

2. The device of claim 1, wherein either or both of the first or second wireless telecommunications functions may require simultaneous access to both the first and second antennas.

3. The device of claim 1, wherein the first wireless telecommunications function comprises a wireless LAN technology.

4. The device of claim 3, wherein the wireless LAN technology comprises a wireless LAN according to IEEE 802.11g standards.

5. The device of claim 3, wherein the wireless LAN technology may require simultaneous access to both the first and second antennas.

6. The device of claim 1, wherein the second wireless telecommunications function comprises a Bluetooth wireless technology.

7. The device of claim 1, wherein the antenna switching function is implemented as an independent structure.

8. The device of claim 1, wherein the antenna switching function is integrated with the arbitration function.

9. The device of claim 1, wherein the arbitration function is implemented as an independent structure.

10. The device of claim 1, wherein the arbitration function is integrated with at least a portion of either the first or second wireless telecommunications functions.

11. The device of claim 1, wherein the arbitration function is adapted to control access by forcing radio silence at least one of the first or second wireless telecommunications functions.

12. The device of claim 1, wherein the defined prioritization scheme comprises an access contention function.

13. The device of claim 12, wherein one of the first or second wireless telecommunications functions is adapted to trigger the access contention function.

14. A method of providing simultaneous operation of disparate wireless telecommunication technologies within a single device, comprising the steps of:
   providing a device having a plurality of antennas;

providing an antenna switching function communicatively coupled to the plurality of antennas capable of operating in a dual-antenna mode for providing diversity capabilities;

providing a first wireless telecommunications function communicatively coupled to the antenna switching function;

providing a second wireless telecommunications function communicatively coupled to the antenna switching function;

providing an arbitration function using a probabilistic approach communicatively coupled to the antenna switching function and the first and second wireless telecommunications functions, wherein the arbitration function is provided on a packet-by-packet basis;

providing a defined prioritization scheme comprised of a plurality of assumptions and priorities based on an end-use application; and utilizing the arbitration function to directly control the first and second wireless telecommunications functions and access to the plurality of antennas by the first and second wireless telecommunications functions according to the defined prioritization scheme.

15. The method of claim 14, wherein the antenna switching function allocates access to an antenna by the first or second wireless telecommunications function under control of the arbitration function.

16. The method of claim 14, wherein either or both of the first or second wireless telecommunications functions may require simultaneous access to multiple antennas.

17. The method of claim 14, wherein the step of providing a first wireless telecommunications function further comprises providing a wireless LAN technology.

18. The method of claim 17, wherein the wireless LAN technology comprises wireless LAN technology according to IEEE 802.11g standards.

19. The method of claim 17, wherein the wireless LAN technology may require simultaneous access to multiple antennas.

20. The method of claim 14, wherein the step of providing a second wireless telecommunications function further comprises providing a Bluetooth wireless technology.

21. The method of claim 14, wherein the step of providing an arbitration function further comprises providing hardware implementing an arbitration function.

22. The method of claim 14, wherein the step of providing an arbitration function further comprises providing software implementing an arbitration function.

23. The method of claim 14, wherein the step of utilizing the arbitration function to control access further comprises utilizing the arbitration function to disable radio transmission of at least one of the first or second wireless telecommunications functions.

24. The method of claim 14, wherein the step of providing a defined prioritization scheme further comprises providing an access contention function.

25. The method of claim 24, wherein one of the first or second wireless telecommunications functions may initiate the access contention function.

26. The method of claim 24, wherein the step of providing an access contention function further comprises providing a bias mechanism.

27. The method of claim 26, wherein the step of providing a bias mechanism comprises providing a bias in favor of the first wireless telecommunications function.

28. The method of claim 26, wherein the step of providing a bias mechanism comprises providing a bias in favor of the second wireless telecommunications function.

29. The method of claim 14, wherein the step of providing a defined prioritization scheme further comprises providing first priority to speech communications over one of the wireless telecommunications functions.

30. The method of claim 14, wherein the step of providing a defined prioritization scheme further comprises providing for simultaneous transmission by the first and second wireless telecommunications functions.

31. The method of claim 14, wherein the step of providing a defined prioritization scheme further comprises providing for simultaneous reception by the first and second wireless telecommunications functions.

* * * * *